US012423139B2

(12) United States Patent
Satyarthi et al.

(10) Patent No.: US 12,423,139 B2
(45) Date of Patent: Sep. 23, 2025

(54) EVENT SCHEDULER SUB-SYSTEM FOR AGGREGATION, PRIORITIZATION, AND SERIALIZATION OF SOFTWARE APPLICATION EVENTS

(71) Applicant: Infinera Corp., San Jose, CA (US)

(72) Inventors: Nikhil Satyarthi, Yelahanka (IN); Ashok Kunjidhapatham, Devarachikkanahalli (IN); Sanjeev Ramachandran, Karnataka (IN); Badareenath Alur Sreenivasacharya, Bangalore (IN); Baranidhar Ramanathan, Kasavanahalli (IN)

(73) Assignee: Infinera Corp.

( * ) Notice: Subject to any disclaimer, the term of this patent is extended or adjusted under 35 U.S.C. 154(b) by 454 days.

(21) Appl. No.: 18/160,703

(22) Filed: Jan. 27, 2023

(65) Prior Publication Data

US 2023/0236882 A1 Jul. 27, 2023

Related U.S. Application Data

(60) Provisional application No. 63/303,590, filed on Jan. 27, 2022.

(51) Int. Cl.
*G06F 9/48* (2006.01)
*G06F 9/54* (2006.01)

(52) U.S. Cl.
CPC ............ *G06F 9/4881* (2013.01); *G06F 9/542* (2013.01)

(58) Field of Classification Search
None
See application file for complete search history.

(56) References Cited

U.S. PATENT DOCUMENTS

| 8,387,057 | B2 * | 2/2013 | Wilmarth | ................ | G06F 9/526 |
| | | | | | 707/800 |
| 10,489,220 | B2 * | 11/2019 | Ranganathan | .......... | G06F 9/542 |
| 2003/0233485 | A1 * | 12/2003 | Khan | ...................... | G06F 9/542 |
| | | | | | 719/318 |
| 2012/0239372 | A1 * | 9/2012 | Kruus | ...................... | G06F 30/33 |
| | | | | | 703/17 |

(Continued)

FOREIGN PATENT DOCUMENTS

| CN | 102340495 A | * | 2/2012 | | |
| WO | WO-2011153227 A2 | * | 12/2011 | .......... | G06F 11/3006 |
| WO | WO-2013189753 A1 | * | 12/2013 | ............. | G06F 9/542 |

*Primary Examiner* — Charles E Anya

(57) ABSTRACT

Disclosed herein are methods and systems involving an event scheduler sub-system configured for aggregation, prioritization, and serialization of software application events, including a method comprising receiving event and associated event data; determining event type and event object key; storing the event data in an event handler data table; generating a priority group number and an insertion order number associated with the event; generating a new queue element comprising the priority group number, the insertion order number, a reference to the event handler, the object key, and the event type; inserting the new queue element to an event scheduler priority queue; sending a signal from the event handler to the event scheduler indicating availability of the new queue element to process; retrieving the event data associated with a queue element with a highest priority in the priority queue; and passing the event data to an admin application for processing.

20 Claims, 11 Drawing Sheets

(56) References Cited

U.S. PATENT DOCUMENTS

| | | | |
|---|---|---|---|
| 2013/0024875 A1* | 1/2013 | Wang | G06F 9/542 |
| | | | 719/318 |
| 2014/0143793 A1* | 5/2014 | Chang | G06Q 10/00 |
| | | | 719/318 |
| 2016/0117471 A1* | 4/2016 | Belt | G16H 20/10 |
| | | | 705/2 |
| 2017/0171353 A1* | 6/2017 | Park | H04L 67/63 |
| 2018/0107530 A1* | 4/2018 | Gupta | G06F 16/2282 |
| 2018/0173577 A1* | 6/2018 | Stanfill | G06F 9/542 |

\* cited by examiner

| EventType | PriorityGroupNumber |
|---|---|
| EventSource1_High_Prior | 0 |
| EventSource1_Low_Prior | 1 |
| EventSource2_High_Prior | 0 |
| EventSource2_Low_Prior | 1 |
| EventSource3_High_Prior | 2 |
| EventSource3_Med_Prior | 3 |
| EventSource3_Low_Prior | 4 |

FIG. 4

| Object Key | Object Data |
|---|---|
| 5 | ACTIVE |
| 8 | FAULTED |
| 22 | READY |
| 101 | DEACTIVATED |

180a → 5 ACTIVE
180b → 8 FAULTED
180c → 22 READY
180d → 101 DEACTIVATED

FIG. 5A

| Object Key | Object Data | | | |
|---|---|---|---|---|
| 5 | ACTIVE | FAULTED | ACTIVE | ACTIVE |
| 8 | FAULTED | ACTIVE | READY | ACTIVE |
| 22 | READY | READY | ACTIVE | READY |
| 101 | DEACTIVED | READY | READY | ACTIVE |

| Group | Group Name | Event Type | No of events |
|---|---|---|---|
| 0 | HIGH_PRIORITY_EVENTS | OCP_PASSBAND_FAULT_STATE_UPDATES | 1 |
| 1 | ORCH_INTERNAL_EVENTS | INTERNAL_EVENT | 1 |
| 2 | PCS_SYNC_EVENT | PCS_CONTROL_BLOCK_SYNC_UPDATE | 1 |
| 3 | LOADING_IMPACTING_EVENTS | OCP_NEIGHBOR_STATE_UPDATES<br>PCS_CONTROL_BLOCK_STATUS_UPDATE<br>PCS_LINK_CTRL_DATA_UPDATE<br>PCS_BAND_STATUS_UPDATE<br>EQUIP_STATUS_UPDATE<br>PCS_CONTROL_BLOCK_EXT_HEALTH_STATUS_UPDATE | 6 |
| 4 | SEGMENT_BAND_SCG_DEACTIVATION | OTSA_UPDATE_INTERFACE_FOR_DEACTIVATION | 1 |
| 5 | SERVICE_PB_DEACTIVATION | OCP_PASSBAND_DEACTIVATION_STATE_UPDATES<br>CM_SERVICE_PREPARE_DELETE_UPDATE<br>CM_SERVICE_DELETE_UPDATE<br>CM_SERVICE_CLEANUP_UPDATE<br>CM_PASSBAND_ADMIN_STATE_DISABLED_UPDATE<br>CM_PASSBAND_SHUTTER_STATE_CLOSE_UPDATE | 6 |
| 6 | LOCAL_DEACTIVATION | OCP_PASSBAND_DEACTIVATION_STATUS_UPDATES | 1 |
| 7 | MEDIUM_PRIORITY_EVENTS | OCP_GENERIC_NOTIFICATION_UPDATES<br>OCP_GENERIC_ACTION_UPDATES<br>OCP_GENERIC_MSG_DISPATCH_UPDATES<br>LDM_LOAD_BATCH<br>PCS_PASSBAND_STATE_UPDATES<br>PCS_COMMAND_RESPONSE_UPDATE<br>PCS_PASSBAND_SENSING_UPDATES | 7 |

FIG. 10A

| 8 | OTSA_INTERFACE_EVENTS | OTSA_CREATE_INTERFACE<br>OTSA_DELETE_INTERFACE<br>OTSA_UPDATE_INTERFACE | 3 |
|---|---|---|---|
| 9 | SEGMENT_BAND_SCG_ACTIVATION | OTSA_UPDATE_INTERFACE_FOR_ACTIVATION | 1 |
| 10 | OTSA_SYNC_DONE | OTSA_SYNC_END | 1 |
| 11 | LOCAL_ACTIVATION | CM_PASSBAND_START_SENSING<br>OCP_PASSBAND_ACTIVATION_STATE_UPDATES<br>CM_SERVICE_CREATE_UPDATE<br>CM_PASSBAND_ADMIN_STATE_ENABLED_UPDATE<br>CM_PASSBAND_SHUTTER_STATE_OPEN_UPDATE | 5 |
| 12 | CM_SYNC_DONE | CM_SYNC_END | 1 |
| 13 | LOW_PRIORITY_EVENTS | OCP_PASSBAND_LOW_PRIORITY_STATE_UPDATES<br>OCP_PASSBAND_LOW_PRIORITY_STATUS_UPDATES | 2 |

EVENT SCHEDULER SUB-SYSTEM FOR AGGREGATION, PRIORITIZATION, AND SERIALIZATION OF SOFTWARE APPLICATION EVENTS

CROSS REFERENCE TO RELATED APPLICATION

This application claims the benefit of U.S. Provisional Patent Application No. 63/303,590, which was filed on Jan. 27, 2022, the contents of which are incorporated herein by reference in their entirety.

BACKGROUND OF THE INVENTION

Current software systems may comprise a consumer software application which processes events generated from multiple producer software applications. In some computer systems, it may be possible that before the consumer software application is scheduled to process these events on a central processing unit (the CPU), there may be multiple events from the same or different producer software applications that are also waiting to be processed. In current systems that have a shared processor and consumer software applications which need to process events generated from multiple producer software applications, there may be a "pile-up" of multiple events from the same or different producer software application(s) before the consumer application is scheduled on the shared processor. The existence of multiple events needing to be processed on the CPU creates a problem of how to determine which events to process in what order and when with the consumer software applications on the shared processor.

In current systems, events may be processed using only one of serialized processing, aggregation, or prioritization, for example. For a serialized processing of events, a queue-based actor thread may be used in some of the implementations. For aggregation of events, a lookup-table based on map or hash may be used in some implementations. And for prioritization, a priority queue may be used for some implementations. However, current systems do not support serialization, aggregation, and prioritization concurrently based on the specific type of these events within the same software implementation. Further, known systems are not user-programmable, which means, for example, that they cannot utilize serialization, aggregation, and prioritization for different events based on operator and/or client specific requirements.

The systems and methods described herein solve these and other problems by providing an event scheduling mechanism (which may be referred to as an event scheduler sub-system) configured to allow prioritization of events generated by multiple producer applications, sequential processing of stateful events (such as events having the same priority) either from the same producer or different producer applications, and/or aggregation of state-less events generated by a producer application, as well as handing-off the latest event for processing to the consumer software application, which may then implement processing of the event on the CPU. In one implementation, the systems and methods are utilized in conjunction with an optical data transportation network and/or network components. In some implementations, the systems and methods are utilized in conjunction with business software systems or other software systems.

SUMMARY OF THE INVENTION

In one aspect, in accordance with some implementations, the specification describes methods and systems including a software system that may comprise one or more consumer software applications (which may be referred to as admin applications) configured to process multiple events generated from multiple producer software applications (which may be referred to as event sources) on a central processing unit. In one implementation, a particular admin application may be listening to multiple event sources and consume events generated by the multiple event sources. The software system may be hosted on a computer system that has a processor that is shared by the one or more consumer applications or other applications.

In such a system, processor-based resource constraints may make it expedient to prioritize, aggregate, and/or order in sequence, the events generated by the producer applications to allow events to be efficiently processed by the consumer application on the processor. For instance, an event scheduler sub-system may be provided with prioritization logic programmed to queue events for processing by the consumer application with events with the highest priority passed to the consumer application for processing first, regardless of which producer application they came from or when they were originated in time. Furthermore, to avoid processing of multiple events of the same type or outdated events, the event scheduler sub-system may be provided with an aggregation logic which may be programmed to combine multiple events into one single aggregated event (which may be the latest event, for instance) and pass the aggregated event to the consumer application for processing. A sequential but wasteful processing of a chain of redundant events without any aggregation may further cause additional load on the CPU which may further aggravate the problem of software applications getting starved of the CPU resource. However, sequential processing of certain events may still be desired due to the business-specific requirements, such as in cases where there may be an ordering dependency between the events.

The systems and methods described herein solve these problems using an event scheduler sub-system which can support serialization, aggregation, and prioritization all at the same time, and which can be flexibly programmed in the system.

In one aspect, in accordance with some implementations, the specification describes methods and systems including a system, comprising: a processor; and one or more non-transitory computer readable memory storing instructions and data associated with an event scheduler and two or more event handlers, each event handler of the two or more event handlers associated with a corresponding event source of two or more event sources, the data associated with the two or more event handlers comprising a plurality of data tables for each of the event handlers, each of the plurality of data tables having an associated event type, the data associated with the event scheduler comprising a priority queue and a global insertion order number, wherein the instructions, when executed by the processor, cause the processor to: receive, from one of the two or more event sources, an event and associated event data; determine, by the event handler corresponding to the event source of the event data, an event type and an object key for the event; store the event data in one of the plurality of data tables of the event handler corresponding to the event source of the event data, the one of the plurality of data tables having an associated event type that matches the event type of the event; generate, using the event handler, a priority group number associated with the event; generate, using the event handler, an insertion order number associated with the event, by incrementing the global insertion order number; generate, using the event handler, a new queue element comprising the priority group number, the insertion order number, a reference to the event handler, the object key, and the event type of the event; insert the new queue element to the priority queue of the event scheduler, the priority queue storing at least one existing queue element, the existing queue element comprising a second priority group number, a second insertion order number, a second reference to an event handler, a second object key, and a second event type of a second event, wherein inserting the new queue element includes organizing the new queue element and the existing queue element in order of priority in the priority queue of the event scheduler based on a comparison of the priority group number of the new queue element and the second priority group number of the existing queue element; send a signal from the event handler to the event scheduler, the signal indicating availability of the new queue element to process; retrieve, using the event scheduler, the event data associated with a queue element with a highest priority in the priority queue from the one of the plurality of data tables; and pass the event data associated with the queue element with the highest priority in the priority queue from the event scheduler to an admin application for processing.

In some implementations of the exemplary system, retrieving the event data associated with the queue element with the highest priority further comprises: deleting the event data from the one of the plurality of data tables of the event handler.

In some implementations of the exemplary system, the event data comprises the object key and an object data.

In some implementations of the exemplary system, organizing the new queue element and the existing queue element in order of priority in the priority queue of the event scheduler further comprises comparing the insertion order number of the new queue element and the second insertion order number of the existing queue element.

In some implementations of the exemplary system, organizing the new queue element and the existing queue element in order of priority in the priority queue of the event scheduler further comprises: determining that the priority group number of the new queue element is equal to the second priority group number of the existing queue element by comparing the priority group number of the new queue element and the second priority group number of the existing queue element; comparing the insertion order number of the new queue element and the second insertion order number of the existing queue element to determine whether the insertion order number of the new queue element is lower than the second insertion order number of the existing queue element; and arranging the new queue element and the existing queue element in order of priority based on which one of the new queue element and the existing queue element has a lower insertion order number.

In some implementations of the exemplary system, the event handler uses information stored in an event-type table to generate the priority group number associated with the event.

In some implementations of the exemplary system, the event is a first event and the associated event data is associated first event data, and wherein the instructions, when executed by the processor, cause the processor to: receive, from the two or more event sources, a second event and associated second event data; and, aggregate, the first event data and the second event data.

In some implementations of the exemplary system, causing the processor to aggregate the first event data and the second event data, comprises causing the processor to: determine, by the event handler corresponding to the event source of the second event data, a second event type and a second object key for the second event; determine that the second event type is the same as the first event type by comparing the second event type and the first event type; determine that the second object key is the same as the object key associated with the first event by comparing the second object key to the object key for the first event; and overwrite the event data associate with the first event in the one of the plurality of data tables with the second event data associated with the second event.

In some implementations of the exemplary system, the instructions, when executed by the processor, cause the processor to: process, by the admin application, the event data passed from the event scheduler to the admin application.

In some implementations of the exemplary system, the event is a first event and the associated event data is first event data, and the instructions, when executed by the processor, cause the processor to: receive, from the two or more event sources, a second event and second event data associated with the second event; and, serialize the first event data and the second event data.

In some implementations of the exemplary system, causing the processor to serialize the first event data and the second event data, comprises causing the processor to: generate, using the event handler, a second event type and a second object key associated with the second event; compare the second event type and the event type associated with the first event, determine that the second event type is the same as the event type associated with the first event, and compare the second object key to the object key associated with the first event; determine that the second object key is the same as the object key associated with the first event; and append the second event data to the first event data in the one of the plurality of data tables having the associated event type that matches the event type of the first event and the second event.

In some implementations of the exemplary system, the priority of the event types in the event-type table is user-programmable.

In some implementations of the exemplary system, after receiving the event and associated event data, the instructions cause the processor to lock all of the plurality of data tables of the event handler associated with the event source of the event data, such that the plurality of data tables are uneditable while the plurality of tables are locked.

In some implementations of the exemplary system, after generating the priority group number associated with the event, the instructions cause the processor to lock all data members of an event scheduler, such that the data members are uneditable while the data members are locked, the data members including the priority queue and the global insertion order number associated with the event scheduler.

In some implementations of the exemplary system, after the new queue element is inserted into the priority queue of the event scheduler, the instructions cause the processor to unlock all data members of the event scheduler, such that the data members are editable after the data members are unlocked.

In some implementations of the exemplary system, after sending the signal from the event handler to the event scheduler, the instructions cause the processor to unlock all of the plurality of data tables of the event handler associated with the event source of the event data, such that the plurality of data tables are editable after the plurality of data tables are unlocked.

In some implementations of the exemplary system, the instructions associated with the event scheduler for retrieving the event data associated with the queue element with the highest priority in the priority queue from the one of the plurality of data tables, and passing the event data from the event scheduler to the admin application for processing, are executed in a thread separate than threads which update the event data to the plurality of data tables within the two or more event handlers.

In another aspect, in accordance with some implementations, the specification describes a method, comprising: receiving, from one of two or more event sources, an event and associated event data; determining, by an event handler corresponding to the event source of the event data, an event type and an object key for the event; storing the event data in one of a plurality of data tables of the event handler corresponding to the event source of the event data, the one of the plurality of data tables having an associated event type that matches the event type of the event; generating, using the event handler, a priority group number associated with the event; generating, using the event handler, an insertion order number associated with the event, by incrementing the global insertion order number; generating, using the event handler, a new queue element comprising the priority group number, the insertion order number, a reference to the event handler, the object key, and the event type of the event; inserting the new queue element to a priority queue of an event scheduler, the priority queue storing at least one existing queue element, the existing queue element comprising a second priority group number, a second insertion order number, a second reference to an event handler, a second object key, and a second event type of a second event, wherein inserting the new queue element includes organizing the new queue element and the existing queue element in order of priority in the priority queue of the event scheduler based on a comparison of the priority group number of the new queue element and the second priority group number of the existing queue element; sending a signal from the event handler to the event scheduler, the signal indicating availability of the new queue element to process; retrieving, using the event scheduler, the event data associated with a queue element with a highest priority in the priority queue from the one of the plurality of data tables; and passing the event data associated with the queue element with the highest priority in the priority queue from the event scheduler to an admin application for processing.

In some implementations of the exemplary method, retrieving the event data associated with the queue element with the highest priority further comprises: deleting the event data from the one of the plurality of data tables of the event handler.

In some implementations of the exemplary method, the event data comprises the object key and an object data.

In some implementations of the exemplary method, organizing the new queue element and the existing queue element in order of priority in the priority queue of the event scheduler further comprises comparing the insertion order number of the new queue element and the second insertion order number of the existing queue element.

In some implementations of the exemplary method, organizing the new queue element and the existing queue element in order of priority in the priority queue of the event scheduler further comprises: determining that the priority group number of the new queue element is equal to the second priority group number of the existing queue element by comparing the priority group number of the new queue element and the second priority group number of the existing queue element; comparing the insertion order number of the new queue element and the second insertion order number of the existing queue element to determine whether the insertion order number of the new queue element is lower than the second insertion order number of the existing queue element; and arranging the new queue element and the existing queue element in order of priority based on which one of the new queue element and the existing queue element has a lower insertion order number.

In some implementations of the exemplary method, the event handler uses information stored in an event-type table to generate the priority group number associated with the event.

In some implementations of the exemplary method, the event is a first event and the associated event data is associated first event data, and wherein the instructions, when executed by the processor, cause the processor to: receive, from the two or more event sources, a second event and associated second event data; and, aggregate, the first event data and the second event data.

In some implementations of the exemplary method, the event is a first event and the associated event data is associated first event data, and wherein the method further comprises: receiving, from the two or more event sources, a second event and associated second event data; determining, by the event handler corresponding to the event source of the second event data, a second event type and a second object key for the second event; determining that the second event type is the same as the first event type by comparing the second event type and the first event type; determining that the second object key is the same as the object key associated with the first event by comparing the second object key to the object key for the first event; and overwriting the event data associate with the first event in the one of the plurality of data tables with the second event data associated with the second event.

In some implementations of the exemplary method, the priority of the event types in the event-type table is user-programmable.

In some implementations of the exemplary method, after receiving the event and associated event data, the method further comprises locking all of the plurality of data tables of the event handler associated with the event source of the event data, such that the plurality of data tables are uneditable while the plurality of tables are locked.

In some implementations of the exemplary method, after generating the priority group number associated with the event, the exemplary method further comprises locking all data members of an event scheduler, such that the data members are uneditable while the data members are locked, the data members including the priority queue and the global insertion order number associated with the event scheduler.

In some implementations of the exemplary method, after the new queue element is inserted into the priority queue of the event scheduler, the exemplary method further comprises unlocking all data members of the event scheduler, such that the data members are editable after the data members are unlocked.

In some implementations of the exemplary method, after sending the signal from the event handler to the event scheduler, the exemplary method further comprises unlocking all of the plurality of data tables of the event handler associated with the event source of the event data, such that the plurality of data tables are editable after the plurality of data tables are unlocked.

In some implementations of the exemplary method, instructions associated with the event scheduler for retrieving the event data associated with the queue element with the highest priority in the priority queue from the one of the plurality of data tables, and passing the event data from the event scheduler to the admin application for processing, are executed in a thread separate from threads which update the event data to the plurality of data tables within the two or more event handlers.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 4 is a diagrammatic representation of an exemplary event-type table in accordance with one implementation of the present disclosure.

FIGS. 5A and 5B are diagrammatic representations of exemplary data tables in accordance with exemplary implementations of the present disclosure.

FIG. 10A is an exemplary hypothetical event-type table for use in the use case of FIG. 9.

FIG. 10B is a continuation of the exemplary hypothetical event-type table of FIG. 10A.

DETAILED DESCRIPTION

Figure 1:
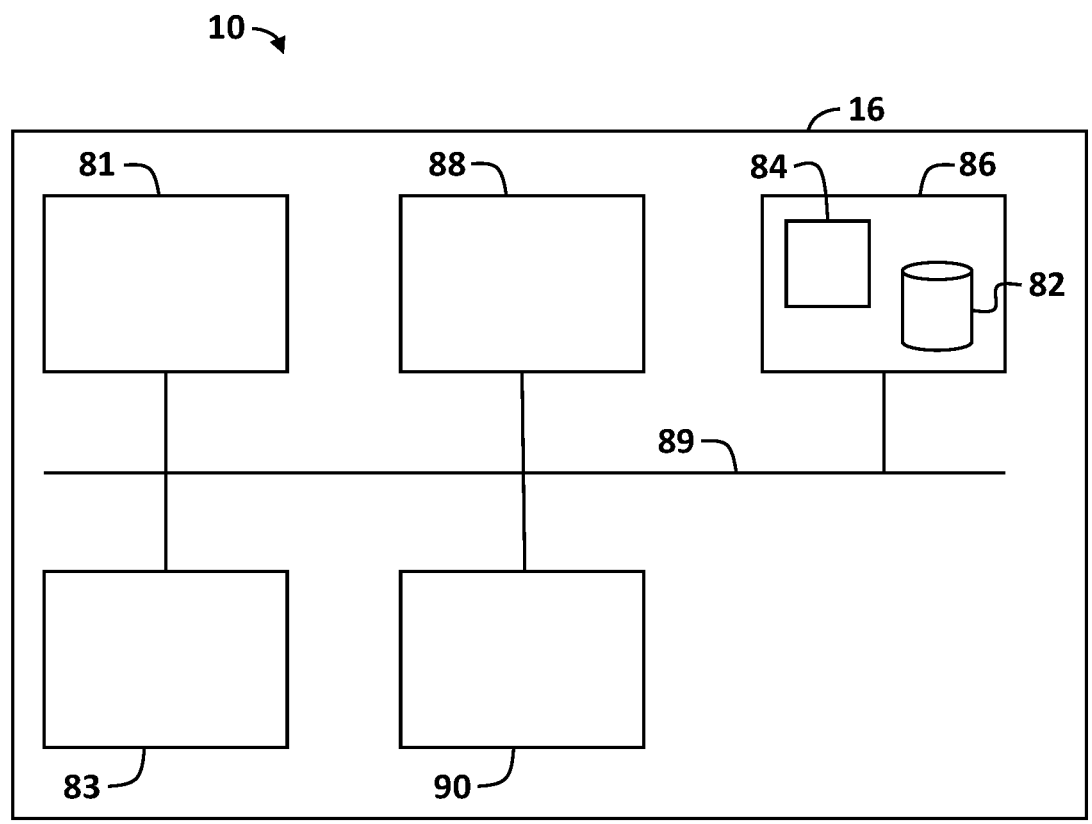
FIG. 1 is a diagrammatic view of hardware forming an exemplary implementation of an administration device constructed in accordance with the present disclosure.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one implementation" or "an implementation" means that a particular element, feature, structure, or characteristic described in connection with the implementation is included in at least one embodiment. The appearances of the phrase "in one implementation" in various places in the specification are not necessarily all referring to the same implementation.

Circuitry, as used herein, may be analog and/or digital components, or one or more suitably programmed processors (e.g., microprocessors, central processing unit, etc.) and associated hardware and software, or hardwired logic. Also, "components" may perform one or more functions. The term "component" may include hardware, such as a processor (e.g., microprocessor, central processing unit, etc.), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, the term "serial" or "sequential" may refer to an order of items or events. In some implementations, the order may be time-based, though it will be understood that other criteria may be used to order the items or events. Time-based sequences may be, for example, sequences based on a time that an event/item is received, a time that an event/item is generated, or other time associated with the event/item.

Figure 2:
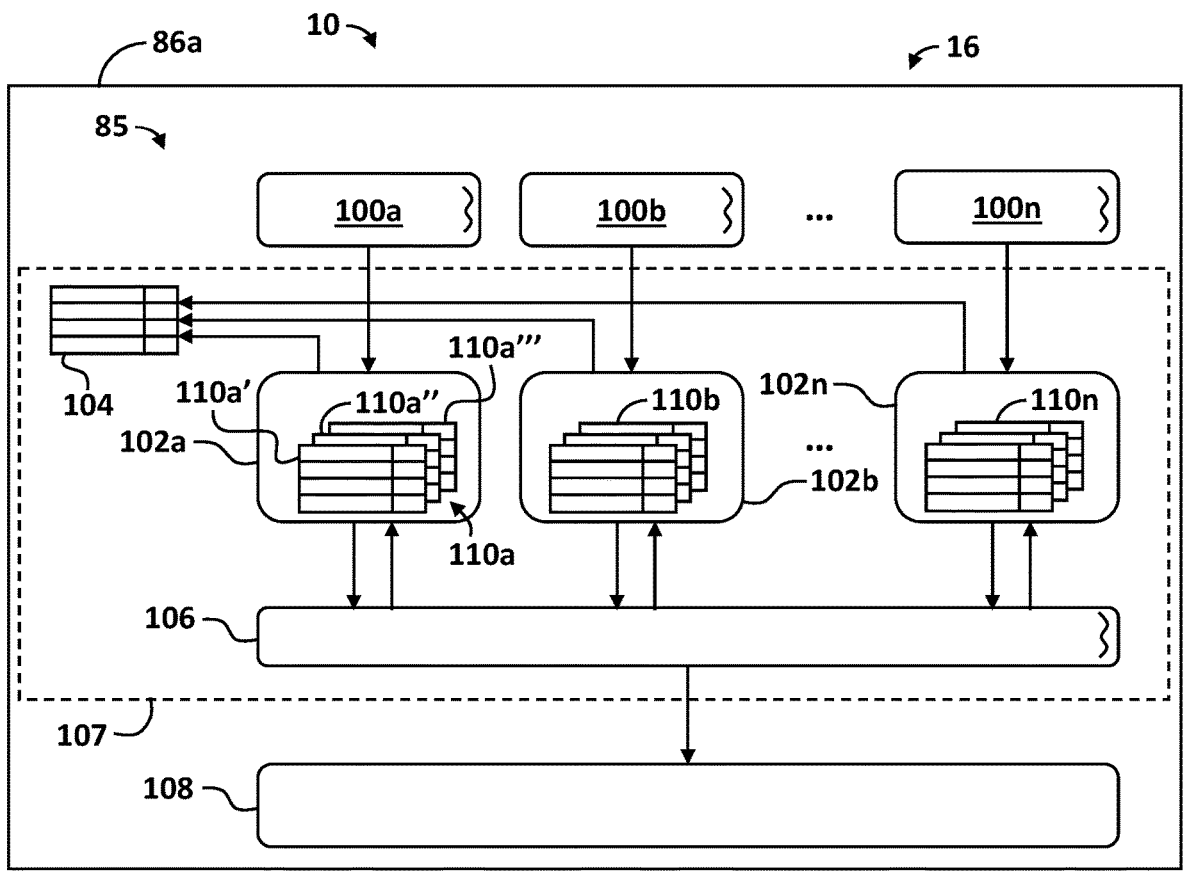
FIG. 2 is a diagrammatic view of a software system comprising producer software applications, an event scheduler sub-system, and a consumer software application in accordance with one implementation of the present disclosure.

Referring now to the drawings, and in particular FIG. 1, shown therein is a diagrammatic view of an exemplary implementation of a computer system 10 including an administration device 16 that may be configured to run and/or operate an event scheduler sub-system 107 (FIG. 2). The computer system 10 may include one or more event source(s) 100, which may be internal or external to the administration device 16. The administration device 16 may include one or more devices that gather, process, search, store, and/or provide information in a manner described herein.

In the illustrated implementation of FIG. 1, the administration device 16 is provided with, one or more databases 82 (hereinafter "database 82"), program logic 84, and one or more processors 88 (hereinafter "processor 88"). The program logic 84 and the database 82 may be stored on one or more non-transitory computer readable storage memory 86 (hereinafter "memory 86") accessible by the processor 88 of the administration device 16. In some implementations, the administration device 16 may include one or more network interface(s) 90.

In some implementations, as shown in FIG. 2, the memory 86 may comprise one or more first memory 86a, which may store a business software system 85, which may be a combination of software instructions (e.g., stored on the program logic 84) which can be executed by the processor 88 and data storage (e.g., database 82) as will be further explained herein.

As used herein, the program logic 84 may comprise computer-executable instructions associated with the business software system 85 (or program) which can be executed by the processor 88. The program logic 84 is configured to create and/or carry out one or more processes associated with the business software system 85. A process, as referred to herein, may have multiple memory areas associated with the process (for example, one or more code segments, data segments, stacks/heaps, etc.).

Additionally, a process may comprise one or more threads. The threads may run in the context of the one or more processes associated with the program logic 84. The term "thread" (which may also be referred to as a software thread), as used herein, refers to a basic unit of a process. The processor 88 may be allocated to respective ones of the threads of a process in order to execute the program logic 84.

In some implementations, the thread may be provided with a program counter, a stack area, and a set of registers that reside in a process. A thread belongs only to one process. However, the code segment and data segment within a process may be shared by different threads of the process. A thread of a process may be in a sleeping state, in which the thread is waiting for an event in the system 10 to occur which the thread will process. At the same time, another thread of the same process may be in a running state, in which the thread is executing instructions of the program logic 84 associated with another task.

The lifecycle of a process, allocation of the processor 88 to threads associated with the process, and related memory management may be done by specialized software, such as an operating system (OS), which may also be part of the program logic 84.

The database 82 may be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 82 can be centralized or distributed across multiple memories 86, 86a.

In some embodiments, the administration device 16 may comprise one or more processors 88 working together, or independently, to execute the program logic 84 stored on the memory 86. Additionally, each administration device 16 may include one or more input device 81 (hereinafter "input device 81") and one or more output device 83 (hereinafter "output device 83"). One or more elements of the administration device 16 may be partially or completely network-based or cloud-based, and may or may not be located in a single physical location.

The processor 88 may be implemented as a single processor or multiple processors working together, or independently, to execute the program logic 84 as described herein. It is to be understood, that in certain embodiments using more than one processor 88, the processors 88 may be located remotely from one another, located in the same location, or comprising a unitary multi-core processor. The processors 88 may be capable of reading and/or executing processor executable code and/or capable of creating, manipulating, retrieving, altering, and/or storing data structures into the memory 86.

Exemplary embodiments of the processor 88 may be include, but are not limited to, a digital signal processor (DSP), a central processing unit (CPU), a field programmable gate array (FPGA), a graphics processing unit (GPU), a microprocessor, a multi-core processor, combinations, thereof, and/or the like, for example. The processor 88 may be capable of communicating with the memory 86, 86a via a path 89 (e.g., a data bus). The processor 88 may be capable of communicating with the input device 81 and/or the output device 83.

The memory 86, 86a may be capable of storing processor executable code such as the program logic 84. The memory 86, 86a may be capable of storing data. Additionally, the memory 86, 86a may be implemented as a conventional non-transitory memory, such as for example, random access memory (RAM), CD-ROM, a hard drive, a solid-state drive, a flash drive, a memory card, a DVD-ROM, a disk, a non-transitory optical drive, combinations thereof, and/or the like, for example.

In some embodiments, the memory 86, 86a may be located in the same physical location as the administration device 16, and/or one or more of the memory 86, 86a may be located remotely from the administration device 16. For example, the memory 86, 86a may be located remotely from the administration device 16 and communicate with the processor 88 via a network. Additionally, when more than one memory 86, 86a is used, one or more memory 86, 86a may be located in the same physical location as the processor 88, and additional memory 86, 86a may be located in a location physically remote from the processor 88. Additionally, the memory 86, 86a may be implemented as a "cloud" non-transitory computer readable storage memory (i.e., one or more memory 86, 86a may be partially or completely based on or accessed using the network).

The input device 81 of the administration device 16 may transmit data to the processor 88. The input device 81 may be located in the same physical location as the processor 88, or located remotely and/or partially or completely network-based. The output device 83 of the administration device 16 may transmit information from the processor 88 to a user. The output device 83 may be located with the processor 88, or located remotely and/or partially or completely network-based.

The memory 86, 86a may store processor executable code and/or information comprising the database(s) 82 and program logic 84. In some embodiments, the processor executable code 84 may be stored as a data structure, such as the database(s) 82 and/or data table, for example, or in non-data structure format such as in a non-compiled text file.

Referring now to FIG. 2, shown therein is a diagrammatic representation of one implementation of one or more memory, such as the first memory 86a, which may store the business software system 85 including the event scheduler sub-system 107.

The business software system 85 may include, or may be in communication with, one or more event sources 100a-100n (which may be referred to as producer applications 100a-100n), one or more event handlers 102a-102n, one or more event-type table 104 (such as data tables), an event scheduler 106, and one or more admin applications 108 (which may be referred to as a consumer application 108). The event handlers 102a-102n, the event-type table 104, and the event scheduler 106 may be part of the event scheduler sub-system 107. In some embodiments of the business software system 85, the producer applications 100a-100n and the event scheduler 106 may be software threads.

Though the event sources 100a-100n are shown and described as part of the administration device 16 and the business software system 85, it will be understood that one or more or all of the event sources 100a-100n may be external to the administration device 16 and/or the business software system 85. The event sources 100a-100n may comprise computer executable instructions which may be part of the administration device 16 or may be part of devices external to the administration device 16. For example, the system 10 may comprise a consumer device (such as a smart phone, tablet, or other computer-based device) and the event sources 100a-100n may include software applications on, partially on, and/or in communication with the consumer device. In one example, event sources 100a-100n may include different software applications within an optical transport network.

The event sources 100a-100n may generate various types of events in the business software system 85. As used herein, the term "event" refers to an action or occurrence recognized by a software system (such as the business software system 85), that may originate asynchronously from an external environment or a software application internal or external to the business software system 85, that may be handled by the business software system 85. Events may be generated or triggered by the business software system 85, by a user, or in other ways external to the business software system 85. Events may include, for example, one or more occurrence, recording, capture, incident, happening, proceeding, episode, and the like.

For each of the event sources 100a-100n, there may be an associated event handler 102a-102n. Once an event source 100a-100n generates an event, data associated with that event may be written to the associated event handler 102a-102n. For instance, the event handlers 102a-102n may comprise one or more data tables 110a-110n or databases which store data associated with an event. As illustrated in FIG. 2, individual ones of the event handlers 102a-102n may comprise a plurality of data tables 110. Individual ones of the plurality of data tables 110 may be configured to store events of the event sources 100a-100n having the same event type. Based on the event type and the associated data, an appropriate one or more of the plurality of data tables 110 within the event handler 102a-102n may be selected to store the event data.

As a hypothetical example, a first event source 100a may be a health monitoring application that may produce multiple events, such as a heart rate event associated with heart rate data, a blood pressure event associated with blood pressure data, and a blood oxygen level event associated with blood oxygen level data, for example. In this hypothetical example, a first event handler 102a may store the data associated with the heart rate events in a first data table 110a', the blood pressure events in a second data table 110a'', and the blood oxygen level events in a third data table 110a'''.

In some implementations, the event handlers 102a-102n, may classify the event into an event type. The event handlers 102a-102n may assign a priority group number to the event based on the event type within the event-type table 104.

Figure 3:
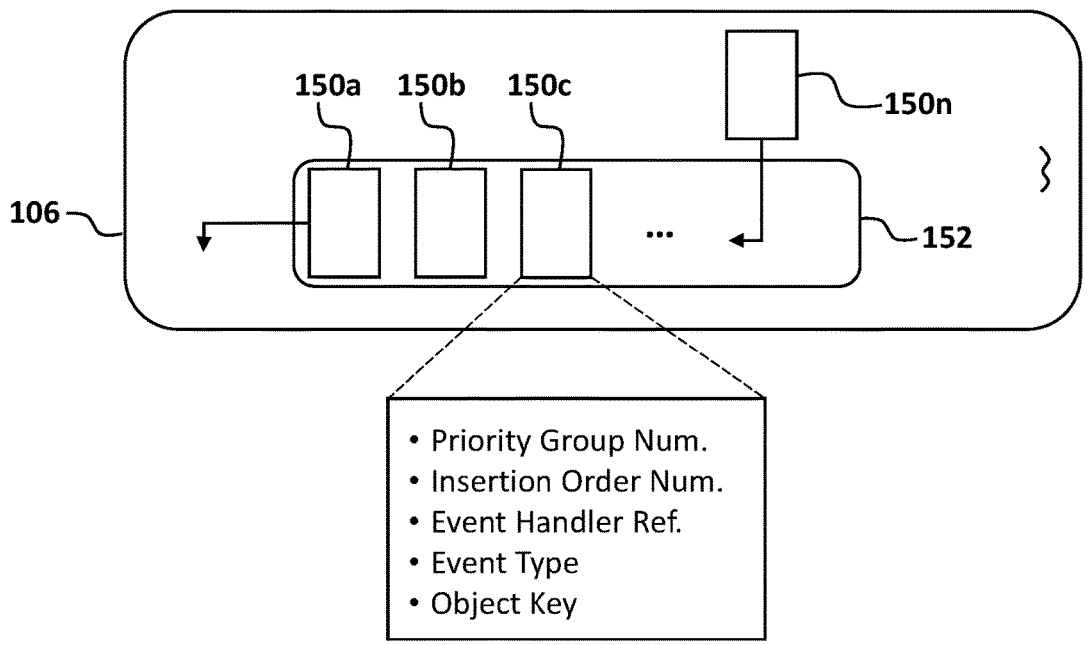
FIG. 3 is a diagram of a priority queue maintained inside an event scheduler of the event scheduler sub-system having a plurality of queue elements in accordance with one implementation of the present disclosure.

The event handler 102a-102n may then generate a queue element 150 (FIG. 3). In one implementation, the queue element 150 may comprise the assigned priority group number, an insertion order number, a reference to the event handler 102 associated with the event data, an object key (or index) of the event data in its respective data table 110, and/or an event type. The event handler 102 may push the queue element 150 to a priority queue 152 in the event scheduler 106. For instance, the event handler 102 may call an application programming interface (API) of the event scheduler 106 and the API may receive the queue element 150 and push the queue element 150 to the priority queue 152. The event data may be retained in the data table 110 of the event handler 102 for retrieval, if necessary, as will be described further herein.

The event scheduler sub-system 107 may be configured as an intermediary between the event sources 100 and the admin application 108. In general, the event scheduler sub-system 107 may be configured to prioritize, aggregate, and/or serialize the events from the event sources 100 to the admin application 108. The admin application 108 may then process the data with the one or more processors 88 based on the prioritization, aggregation, and/or serializing. In some implementations, based on the prioritization, aggregation, and/or serialization, the event scheduler sub-system 107 may delay processing at least a portion of the data associated with one or more events. For instance, processing of low priority events may be delayed to allow higher priority events to be processed first when the admin application 108 has access to the processor 88.

In one implementation, when a new queue element 150 is added to the priority queue 152, the event scheduler 106 may arrange or rearrange the queue elements 150a-150n in order of priority based on the priority group number and the insertion order number of each of the queue elements 150. By way of illustration, in an implementation of the event scheduler sub-system 107 where lower priority group numbers are considered to have a higher priority, if a newly added queue element 150 has a priority group number lower than all other queue elements 150a-150n then in the priority queue 152 will be placed first in line for processing. Once the event scheduler 106 thread is woken up, that queue element 150 placed first in line for processing will be popped out first for further processing.

In another illustrative example, if a first queue element 150a has a priority group number of 0, a second queue element 150b has a priority group number of 2, and a third queue element 150c has a priority group number of 4, a newly added queue element 150n having a priority group number of 1 may be placed in the priority queue 152 between the first queue element 150a and the second queue element 150b.

In yet another illustrative example, if two or more queue elements 150a-150n have the same priority group number, then the queue elements 150a-150n having the same priority group number may be placed in order for processing based on insertion order number with the queue element 150 having the lowest insertion order number being first in line for processing.

The priority queue 152 may be implemented using a variety of data structures. In one embodiment, the priority queue 152 may be a heap data structure that allows for faster enqueue and dequeue operations. Such an implementation of the priority queue 152 may be used, for instance, in a system 10 where a large number of the queue elements 150 may be stored waiting for processing.

Once the event scheduler 106 is woken up on arrival of an event (for example, the receipt of the queue element 150), the event scheduler 106 may use the information (e.g., the event handler reference, event type, and/or object key) contained in the queue element 150 to retrieve event data from the respective data table 110a-110n of the event handlers 102a-102n associated with each of the queue elements 150a-150n in order of priority of the queue elements 150a-150n in the priority queue 152.

For example, continuing the health monitoring application example from above, the first queue element 150a may be associated with a heart rate event and may include an event handler reference (which would point the event scheduler 106 to the first event handler 102a), a heart rate event type (which would point the event scheduler 106 to the first data table 110a'), and an object key associated with the event that would point the event scheduler 106 to an event entry in the first data table 110a' associated with the event where the event data may be retrieved.

Once the event data is retrieved by the event scheduler 106, the event scheduler 106 may erase the event data from the data table 110a-110n of the event handlers 102a-102n and transfer the event data to the admin application 108 for further processing.

Referring now to FIG. 4, shown therein is an exemplary event-type table 104 of the event scheduler sub-system 107 for an exemplary admin application 108 in the system 10, in which the system 10 has three different event sources: a first, second, and third event source 100a, 100b, 100c. The event-type table 104 may be one or more data table, database, data structure, etc. The event-type table 104 may be stored in the one or more memories 86, such as the first memory 86a. The exemplary event-type table 104 of FIG. 4 is provided with five priority groups 0, 1, 2, 3, 4, one of which is assigned to each of the multiple event types from each of the first, second, and third event sources 100a, 100b, 100c. In this example, events (represented by queue elements 150 in the priority queue 152) waiting to be processed by the admin application 108 would be prioritized, with events having a lower priority group number determined to be processed first.

As noted above, prioritization may happen at two levels, first by priority group number and second by insertion order number. In some implementations, the insertion order number may be a global insertion order number which may be incremented and added to the queue element 150 when the queue element 150 is added to the priority queue 152. For instance, a global insertion order number may be incremented in the event scheduler sub-system 107 and inserted into the queue element 150. In such an implementation, the insertion order number associated with two events represent the order in which the queue element 150 associated with each event arrived in the priority queue 152 of the event scheduler 106, i.e., a queue element 150 with a higher insertion order number means that queue element 150 arrived in the priority queue 152 later with respect to queue elements 150 which have a lower insertion order number. This two-level prioritization ensures that, out of pending events with the same priority group number, the pending events elements which arrived earlier in time will be processed first.

The first level of comparison using the priority group number helps achieve the prioritization feature. The second level of comparison using the insertion order number helps achieve the serialization feature. It will be understood that different and/or more levels of prioritization may be used.

In some implementations, the priority number associated with each of the event types may be user programmable based on business-specific needs which may change over time or may be kept fixed throughout the time the business software system 85 is running.

Referring now to FIG. 5A, shown therein is an exemplary data table 110 of one of the event handlers 102 having a first, second, third, and fourth event entries 180a-180d, each having an associated object key and object data. The data table 110 may be a look-up table implemented using a map, hash, or any other supporting data structure. For instance, the exemplary data table 110 shown is a hypothetical look-up table which may be programmed to allow the first, second, third, and fourth event entries 180a-180d to be dynamically added, removed, or updated using the object keys.

In this example, the first event entry 180a is against an event associated with a passband object with an object key of 5 and associated object data of ACTIVE which the state of the passband object. If another event associated with the same passband object with the object key of 5 but with state update of FAULTED is generated by the event source 100 before the first event entry 180a has been processed, the event scheduler sub-system 107 may be configured to update the first event entry 180a and change the object data from ACTIVE to FAULTED. Using this method, the event data may be aggregated so that only the most current event representing the state associated with the object key of 5 is processed by the admin application 108. In the above example, the object data represents a state of a passband object with the state values as ACTIVE, FAULTED, READY, DEACTIVATED, etc.

Referring now to FIG. 5B, shown therein is a second exemplary data table 110' that stores event data in a serialized form. For instance, instead of maintaining a single state against each passband object as illustrated in the aggregated data table 110 illustrated in FIG. 5A, the second data table 110' may be configured to maintain a list of states (first-in-first-out (FIFO) based, for instance) as object data against a passband object (passband objects having object keys of 5, 8, 22, and 101 are used for purposes of illustration). The illustrated list of object data can be used if the states are not intended to be aggregated and instead are desired to be serialized. In such an implementation, individual state updates from the event source 100 are maintained (that is, the individual state updates are not lost and not overwritten by a new state) in the second data table 110' by the event handler 102. For example, each time an event is generated by the event source 100, data associated with that event (e.g., the state) may be written to the associated event handler 102 which may add a new event entry to the end of the list in the second data table 110'. By way of illustration, and not limitation, the second data table 110' is shown having a first, second, third, and fourth entry 182a-182d associated with object keys 5, 8, 22, and 101, respectively, each of the four entries 182a-182 having associated states (object data) stored in serialized form.

While processing the event data (e.g., object data) in the consumer application 108, the individual states can be popped out on a first-in-first-out (FIFO) basis (e.g., processing the list from left to right). This FIFO approach is an example of one type of serialization. In another implementation in which serialization is desired across different object keys and/or event types, the event scheduler sub-system 107 may be programmed to add the insertion order number as described above as a queue element 150 is created for each event, which would allow the event scheduler sub-system 107 to prepare and pass event data associated with each event in a serialized order, regardless of the object key or event type. In some implementations, the event data for each of the objects of same object-type but with different object keys may be appended to another FIFO-based list and the same stored as a data structure within the event handler 102. Such a data structure may be a simple list holding event data for different object keys and is not a table. In such an implementation, serialization may be achieved across objects of same object-type, but with different object keys and the respective event data being sourced from the same event source 100.

It should be noted that the exemplary data table 110 and the second data table 110' in FIG. 5A and FIG. 5B are shown for the purposes of illustration only and should not be considered limiting. It should be appreciated that event data may be organized and stored in other formats in the data table(s) 110 or in non-tabular form.

The object key may be a unique identifying text or number for a particular object type. Non-limiting examples of object keys may include a passband-id associated with a passband in a Wavelength Selective Switch (WSS) device used in an optical network, or a unique policy number for an insured object which may be a person, car, home, or a unique citizen number of a citizen of a country, etc. In the exemplary data table 110 and the second data table 110' illustrated in FIGS. 5A and 5B, the object data is an optical state associated with a passband-id associated with a passband in the WSS device used in an optical network.

The choice of format (e.g., aggregated or serialized, for example) may be need-driven and/or business-driven, and may have different requirements based on the situation and need.

As a hypothetical example, an exemplary consumer application 108 may be designed to track a geographic location of individual citizens. In such a case, one or more location events having a geographical location associated with corresponding citizens may be generated by a particular event source 100. The event handler 102 may be programmed to store an object key (e.g., a unique citizen number) and the geographical location as the object data. Because the sheer amount of data in such a case would be enormous, aggregation of the location data may be necessary and/or the client application might only be interested in the latest geographic location of each citizen. Therefore, each time a new location event for a citizen is received, the event handler 102 may determine if there is an unprocessed location event then overwrite the existing geographic location with the new geographic location. In this example, the event data is aggregated.

In another hypothetical example, an insurance company may require data tables stored and updated in a serialized format. For instance, each person insured by the insurance company may have an associated unique policy number and any number of insurance events. Because each insurance event (e.g., a claim) must be tracked, a data table may be configured to serialize the insurance events using the unique policy number as the object key and the list of claim information as the object data so that information associated with each insurance event is available to a consumer application of the insurance company. In this example, the event data is not aggregated, but, rather, is serialized.

Figure 6:
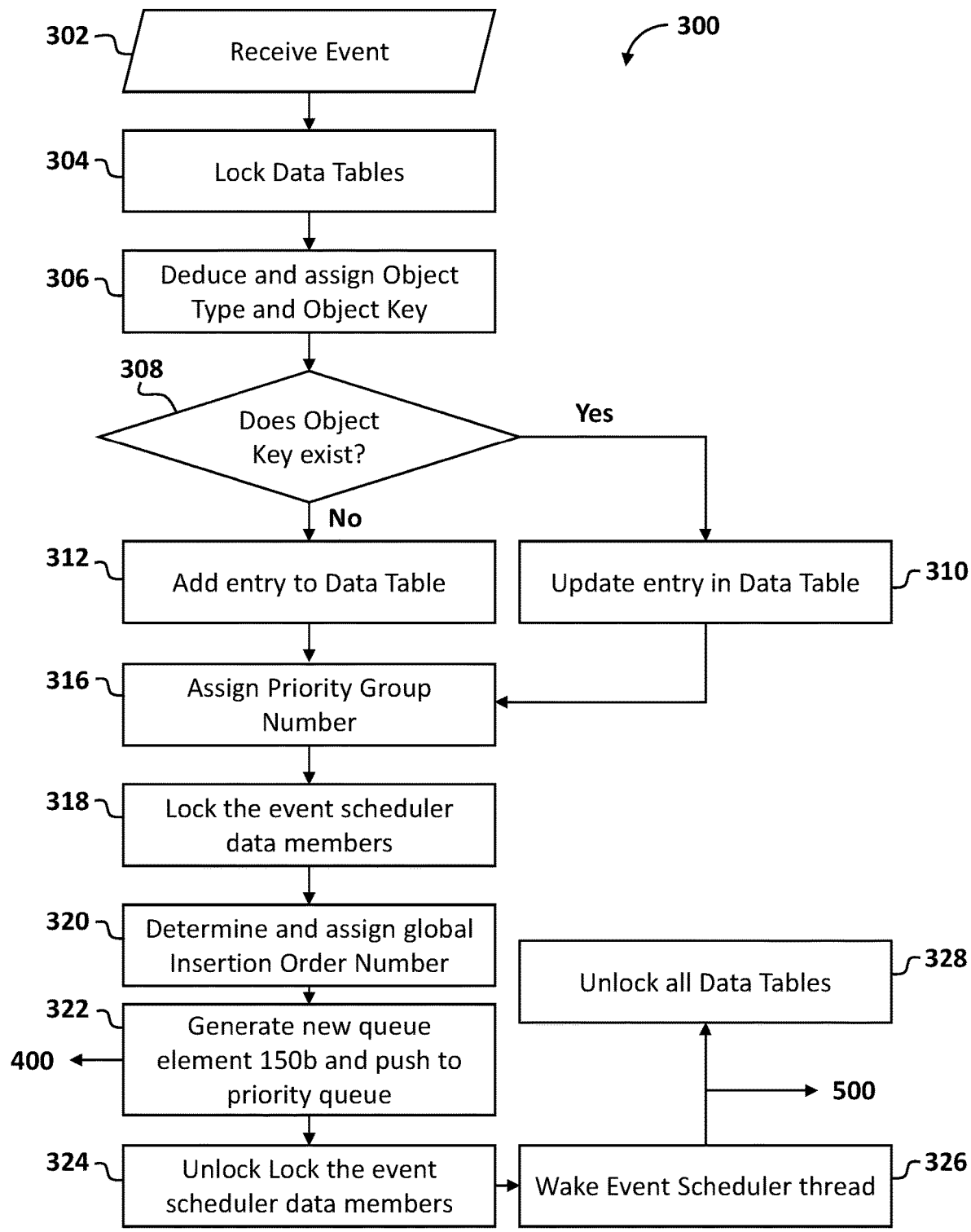
FIG. 6 is a diagram of an example work flow for handling an event by an event handler in accordance with one implementation of the present disclosure.

Referring now to FIG. 6, shown therein is an exemplary workflow diagram 300 illustrating an exemplary process for handling an event by the event handler 102. In step 302, the event handler 102 receives an event from the event source 100.

In step 304, the event handler 102 may lock corresponding data tables 110 of the particular event handler 102 against any updates/changes from the event scheduler 106. It should be noted that threads associated with other event sources 100 may continue to run in parallel and hence the respective event handlers 102 for those event sources 100 can still update/change their respective data tables 110. For example, the event handler receiving the event in step 302 may be the first event handler 102a. In this example, in step 304, the first event handler 102a would lock the first data tables 110a against any changes from the event scheduler 106. However, the event scheduler 106 may continue to make updates/changes to the other data tables 110b-110n of one or more other event handlers 110b-110n. Also, the other event handlers 102b-102n may update/change the corresponding respective data tables 110b-110n. Such a parallelism across the different threads in the business software system 85 utilizes the processor 88 efficiently with minimal contention for locks protecting the shared data structures. This maximizes the performance and throughput of the overall business software system 85.

The "lock" may be implemented using a software mutex (that is, a mutual exclusion). A mutex is a synchronization primitive usable to enforce a limit on the number of accesses to a shared data structure, which is protected using the mutex when there are multiple threads accessing the shared data structure. Such an enforcement may be used to avoid race conditions and subsequent logical inconsistency in the shared data structure which may potentially arise due to multiple access to the shared data by different threads. For example, by using a mutex, the thread which acquires the mutex can be the only thread which can access the shared data structure and other threads would be denied access to the same while the mutex is held. Once the thread which had acquired the mutex releases the same (that is, unlocks the same), other threads may be granted access to the shared data structure. This mutual exclusivity among the threads to the shared data structure enforced using a mutex maintains the logical consistency of the data.

In step 306, the event handler 102 may determine the event type, object type, and the object key and assigns the object key to the event. The event type, object type, and the object key may be determined by the event handler 102 based on the event data associated with the event. This step may be referred to as classification of the event. The event type or the object type may be used by the event handler 102 to determine the data table 110 which may be used for look-up, insertion, removal, etc., of the event. The event type may be selected from a predefined list such as the ones found in the event-type table 104 described above.

In step 308, the event handler 102 may determine if an event entry 180 already exists in the respective data table 110 associated with the event type that has an object key that matches (that is the same as) the object key determined in step 306. For instance, continuing the hypothetical health monitoring application example used above, if the event handler 102 determines that the event is a heart rate event, the event handler 102 would determine if an event entry 180 already existed in the first data table 110a that has an object key that matches the object key determine in step 306. For the hypothetical health monitoring application, the object type may be a patient of a hospital, or a citizen of a country, for instance, and the object key may be the patient-id associated with the patient in the hospital or the citizen number associated with the citizen in the country respectively.

If the event handler 102 may determine that an event entry 180 already exists in the respective data table 110 associated with the event type that has the same object key determined in step 306, in step 310 the event entry 180 that has the same object key may be updated with event data associated with the new event.

It should be noted that exemplary step 310 would be used in an implementation in which the data table 110 stores event data in an aggregated format. As noted above, other implementations of the data table 110 include a serialized format for instance. If the event data is stored in serialized format, for instance, in step 310, the event handler 102 may be programmed to append the new event entry to the existing entry in the table that has the same object key associated with the new event.

If the event handler 102 determines that an event entry 180 does not already exist in the respective data table 110 associated with the event type that has the same object key determined in step 306, in step 312, a new event entry 180 may be created in the data table 110 with the object key determined in step 306.

Following either step 310 or 312, in step 316 the event handler 102 may determine a priority group number based on the event type associated with the event. The priority group number may be selected from a predefined list of priority group numbers such as the ones found in the event-type table 104 described above. The determined priority group number may be assigned to the event.

In step 318, the event handler 102 may be programmed to lock all the data members of the event scheduler 106 against any update by any of the other event handlers 102 in the system in a different context of thread processing, such that the data members are uneditable while locked. The locked data members may include the priority queue 152 and the global insertion order number maintained within the event scheduler 106.

In step 320, the event handler 102 may be programmed to increment the global insertion order number in the event scheduler 106.

In step 322, the event handler 102 may be programmed to generate a new queue element 150 (which will be referred to as new queue element 150b for the purposes of illustration) comprising one or more of: the priority group number (determined in step 316), the insertion order number (incremented in step 320), an event handler reference (associated with the event handler 102), the event type (determined in step 306), and the object key (determined in step 306) of the event and push or insert the new queue element 150 to the priority queue 152 of the event scheduler 106. As part of the insertion process, the new queue element 150 may be prioritized in the priority queue 152 as described in workflow 400 shown in FIG. 7.

In step 324, as shown in FIG. 6, the event handler 102 may unlock the data members of the event scheduler 106, such that the data members are editable after unlocking the data members. The unlocked data members may include the priority queue 152 and the global insertion order number maintained within the event scheduler 106.

In step 326, the event handler 102 may send a signal to the event scheduler 106 thread that wakes it up. The event scheduler 106 thread may then start processing the queue elements 150 of the priority queue 152. The details of the same will be described in the workflow diagram 500 illustrated in FIG. 8.

In step 328, the event handler 102 may unlock the data tables 110, such that the data tables 110 are editable, to allow updates and/or new entries.

Figure 7:
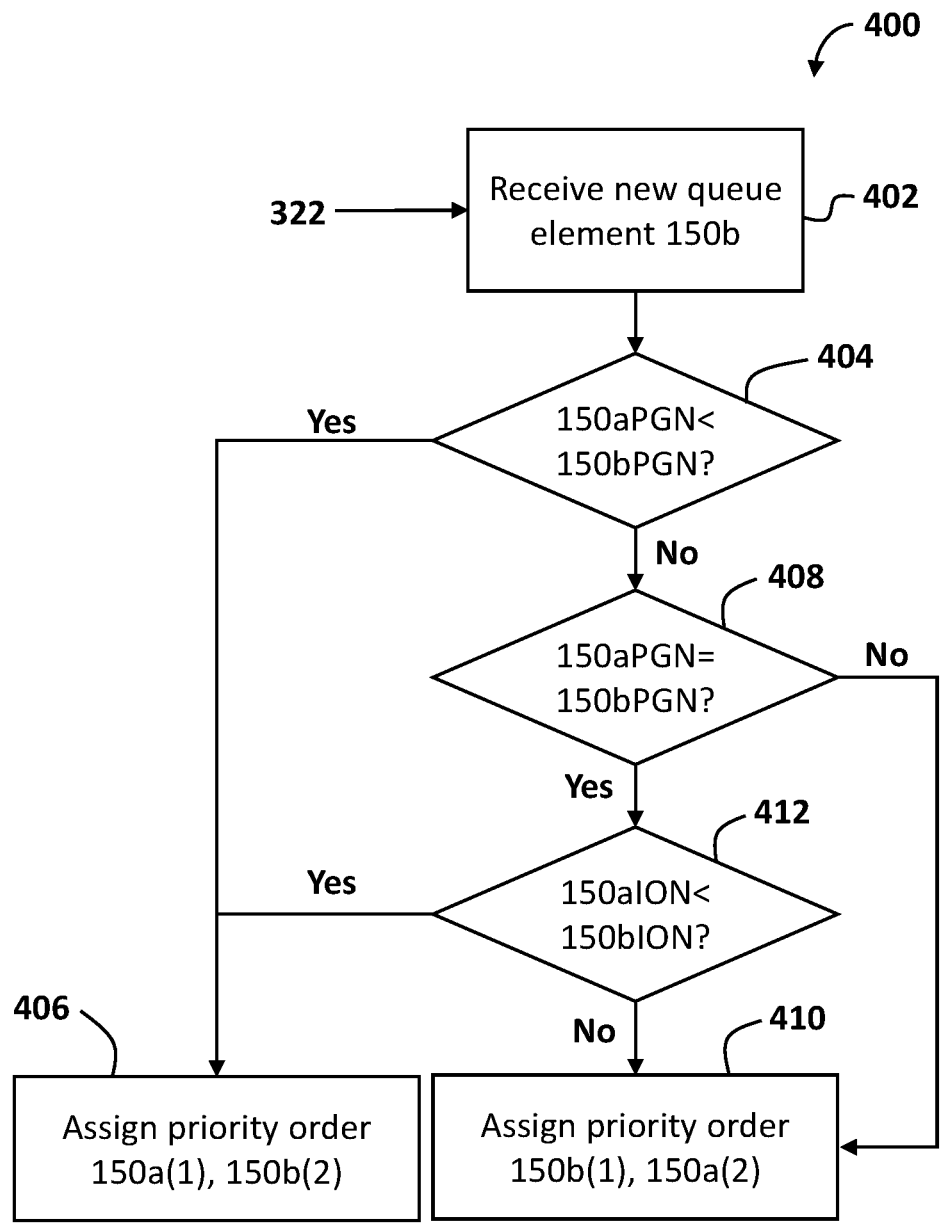
FIG. 7 is a diagram of an example work flow for prioritizing queue elements in a priority queue in accordance with one implementation of the present disclosure.

Referring now to FIG. 7, shown therein is an exemplary workflow diagram 400 illustrating a two-level comparison of a new second queue element 150b and an original first queue element 150a that, for the sake of illustration, has been previously passed into the priority queue 152. In step 402, the event scheduler 106 receives the new second queue element 150b.

In step 404, the event scheduler 106 may compare the priority group number of the original first queue element 150a and the new second queue element 150b to determine if the priority group number of the original first queue element 150a is less than the priority group number of the new second queue element 150b.

It should be noted that in the illustrated embodiment, the event scheduler 106 is shown to prioritize queue elements having lower priority group numbers over queue elements having higher priority group numbers. However, it will be understood that the event scheduler 106 may be programmed to prioritize queue elements having higher priority group numbers over queue elements having lower priority group numbers if a higher priority group number denotes a higher priority.

If the event scheduler 106 determines that the original first queue element 150a has a lower priority group number than the new second queue element 150b in step 404, then, in step 406, the event scheduler 106 is programmed to arrange the original first queue element 150a in front of the new second queue element 150b in the priority queue 152. In other words, when it is time for the admin application 108 to process the events, the event data associated with the original first queue element 150a will be retrieved by the event scheduler 106 and sent to the admin application 108 for processing before the event data associated with the queue second element 150b is retrieved by the event scheduler 106 and sent to the admin application 108 for processing.

If the event scheduler 106 determines that the priority group number of the original first queue element 150a is not less than the priority group number of the new second queue element 150b in step 404, then, in step 408, the event scheduler 106 is programmed to determine if the priority group number of the original first queue element 150a is equal to the priority group number of the new second queue element 150b.

If the event scheduler 106 determines that the priority group number of the original first queue element 150a is not equal to the priority group number of the new second queue element 150b in step 408, then, in step 410, the event scheduler 106 may arrange the new second queue element 150b in front of the original first queue element 150a in the priority queue 152.

If the event scheduler 106 determines that the priority group number of the original first queue element 150a is equal to the priority group number of the second queue element 150b in step 408, then, in step 412, the event scheduler 106 may determine if the insertion order number of the original first queue element 150a is less than the insertion order number of the new second queue element 150b.

If the event scheduler 106 determines that the insertion order number of the original first queue element 150a is less than the insertion order number of the new second queue element 150b in step 412, then the event scheduler 106 may arrange the original first queue element 150a in front of the new second queue element 150b in the priority queue 152 in step 406.

If the event scheduler 106 determines that the insertion order number of the original first queue element 150a is not less than (or, in other words, is greater than) the insertion order number of the new second queue element 150b in step 412, then the event scheduler 106 may arrange the new second queue element 150b in front of (before) the original first queue element 150a in the priority queue 152 in step 410.

Figure 8A:
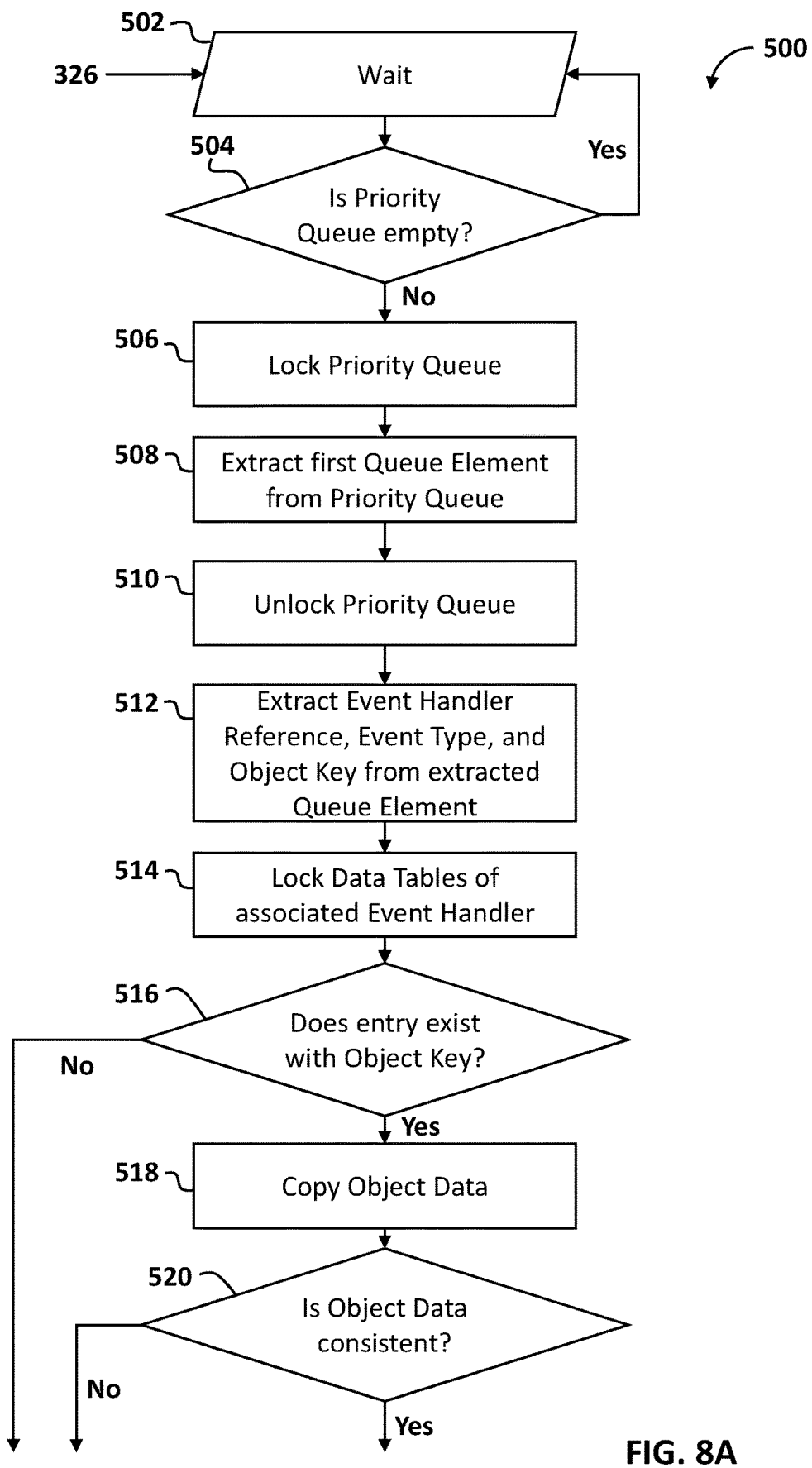
FIGS. 8A and 8B are a diagram of an example work flow for passing an event to an admin application for processing in accordance with one implementation of the present disclosure.
Figure 8B:
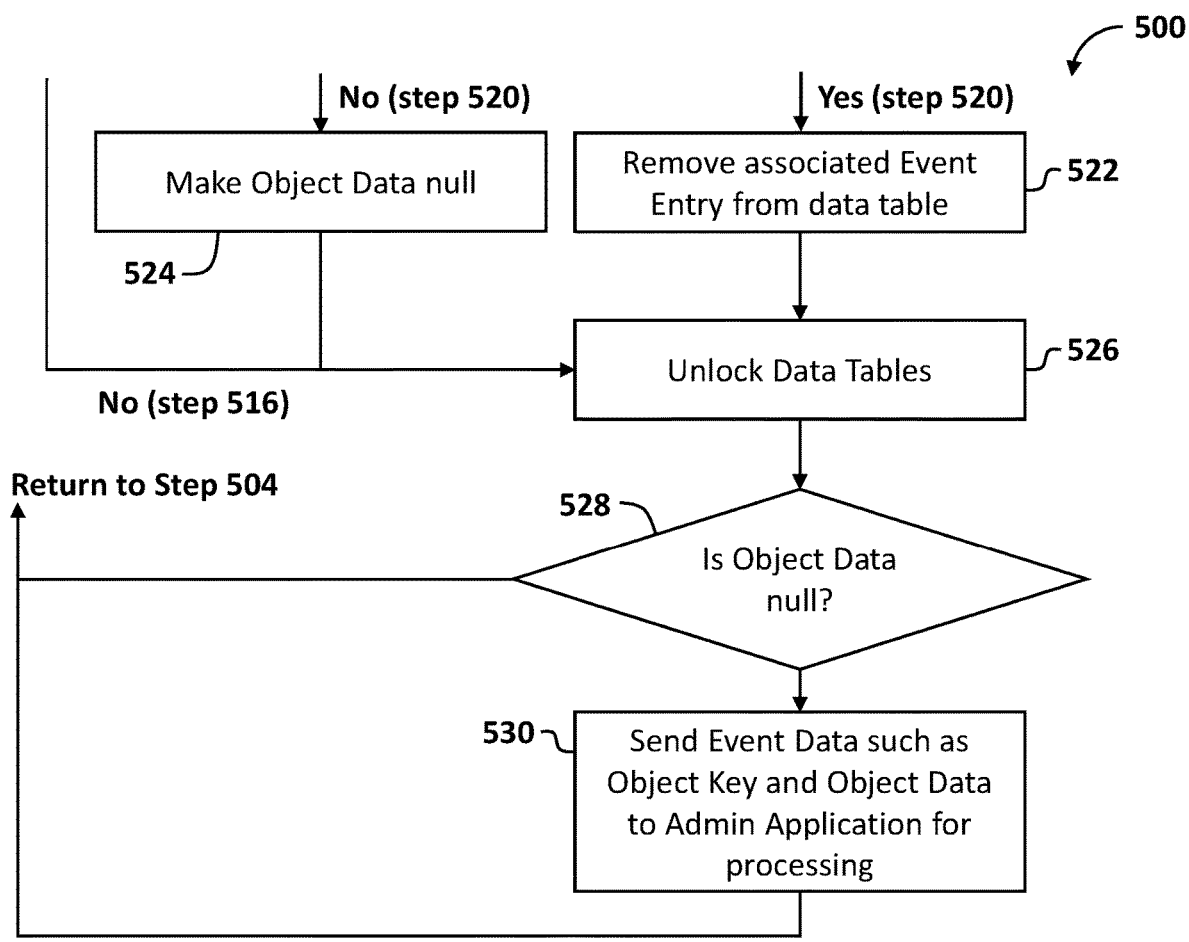

Referring now to FIGS. 8A and 8B, shown therein is the exemplary workflow diagram 500 illustrating an exemplary event scheduler thread for handling the queue elements 150 associated with events as described above.

In step 502, the event scheduler 106 may be programmed to wait for receipt of an event in the form of the queue element 150 and/or for a predetermine period of time before moving to step 504.

In step 504, the event scheduler 106 determines if the priority queue 152 is empty.

If the event scheduler 106 determines that the priority queue 152 is empty in step 504, then the event scheduler 106 may be programmed to return to wait in step 502.

If the event scheduler 106 determines that the priority queue 152 is not empty in step 504, then in step 506 the event scheduler 106 may be programmed to lock the priority queue 152 so that the priority queue 152 is uneditable, such that the priority queue 152 cannot be updated by the event handlers 102, for instance.

In step 508, the event scheduler 106 may be programmed to extract the first queue element 150 in the priority queue 152, the first queue element 150 being the queue element having the highest priority as determined using the workflow 400, for instance.

In step 510, the event scheduler 106 may be programmed to unlock the priority queue 152 against updates from the event handlers 102.

In step 512, the event scheduler 106 may be programmed to extract the event handler reference, the event type, and the object key from the first queue element 150 extracted in step 508.

In step 514, the event scheduler 106 may be programmed to lock the data tables 110 associated with the event handler 102 that the event scheduler 106 determined to be associated with the first queue element 150 using the event handler reference, such that the data tables 110 are uneditable. This locking ensures that the event handler 102 does not update the data tables 110 while the event scheduler 106 is reading the data tables 110.

In step 516, the event scheduler 106 may be programmed to determine if an event entry 180 exists in the respective data table 110 associated with the event type with an object key that matches the object key extracted from the first queue element 150 in step 512.

If the event scheduler 106 finds an event entry 180 does exist that has an object key that matches the object key extracted from the first queue element 150 in step 512, then in step 518 the event scheduler 106 may be programmed to copy the object data associated with the event entry 180 having the matching object key.

In step 520, the event scheduler 106 may be programmed to compare the object data copied in step 518 to the event type extracted in step 512 to determine if the object data copied in step 518 is consistent with the event type extracted in step 512.

In step 522, if the event scheduler 106 determined in step 520 that the object data copied in step 518 was consistent with the event type extracted in step 512, the event scheduler 106 may be programmed to remove the event data entry associated with the first queue element 150 from the data table 110 and move to the next step 526 of unlocking the data tables 110 of the event handler 102.

In step 524, if the event scheduler 106 determine in step 520 that the object data copied in step 518 was not consistent with the event type extracted in step 512, then the event scheduler 106 may be programmed to make the object data null, or remove the object data copied in step 518 and move to the next step 526 of unlocking the data tables 110 of the event handler 102.

If the event scheduler 106 finds an event entry 180 does not exist in step 516, then, in step 526, the event scheduler 106 may be programmed to unlock the data tables 110 in the associated event handler 102, such that the data tables 110 are editable.

In step 528, the event scheduler 106 may be programmed to determine if the object data is null.

If the object data is null in step 528, the event scheduler 106 may be programmed to re-start the workflow 500 at step 504.

If the object data is not null in step 528, the event scheduler 106 may be programmed to send the event data such as the Object Key and Object Data to the admin application 108 for processing and then re-start the workflow 500 at step 504.

Figure 9:
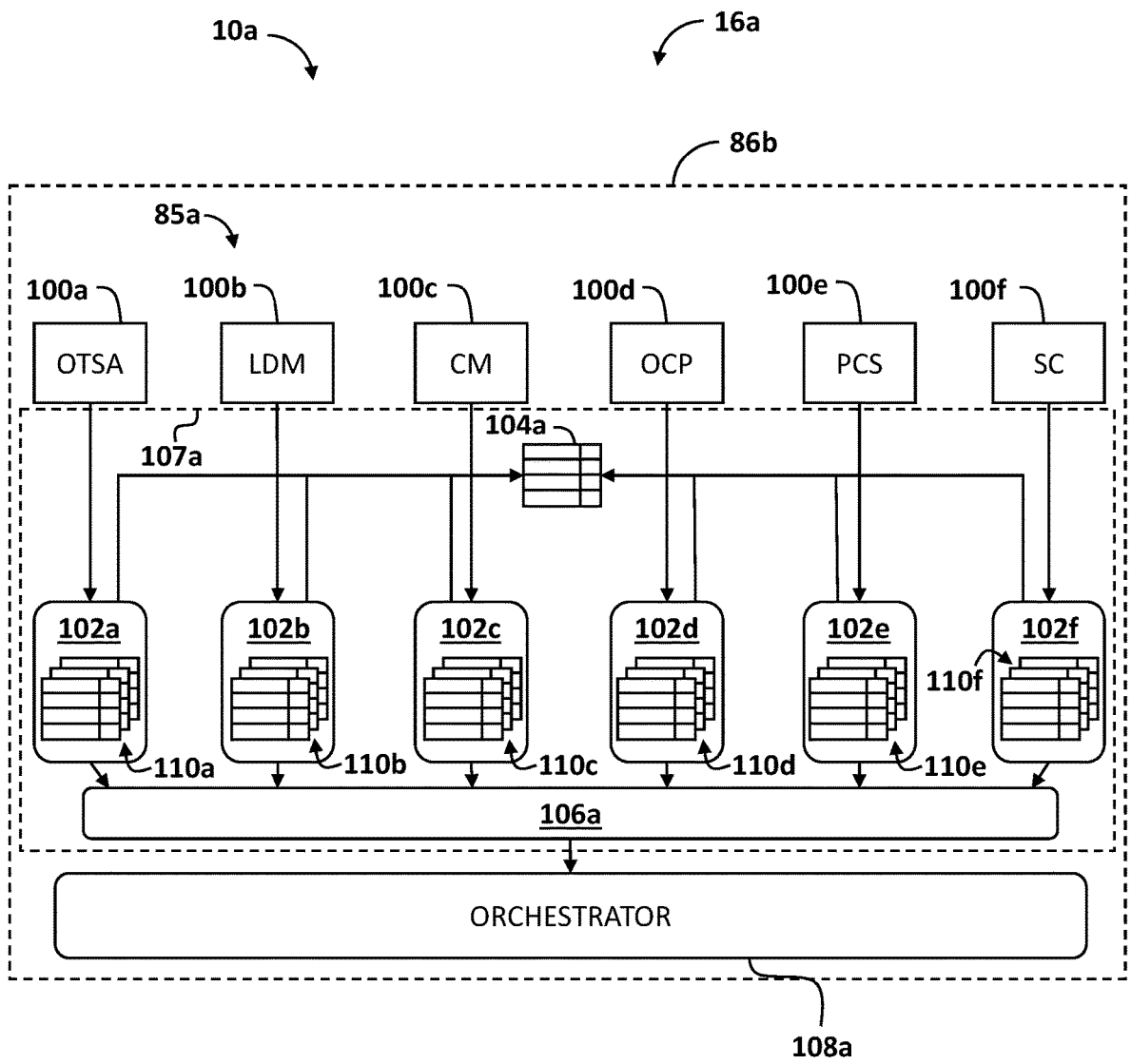
FIG. 9 is a diagram of a hypothetical exemplary use case in accordance with one implementation of the present disclosure.

A hypothetical example of the system and method in use will now be provided. In one implementation, as shown in FIG. 9, a system 10a may include another network administration device 16a having one or more memory 86b storing business software 85a (referred to as Service and Power Control Orchestrator (SPCO) software which may include, for example, the Service and Power Control Orchestrator disclosed in U.S. Patent Application No. 63/305,779, which is incorporated herein by reference). The system 10a may be an optical transport network, which may have a plurality of event sources 100, such as one or more Optical Topology and Switching Abstraction (OTSA) 100a, Loading Manager (LDM) 100b, Connection Manager (CM) 100c, Orchestration Control Protocol (OCP) 100d, Power Control Sequencer (PCS) 100e, and Sync Coordinator (SC) 100f. The plurality of event sources 100 may produce a plurality of events. The network administration device 16a may have an admin application 108a such as an orchestrator. An event scheduler sub-system 107a may be configured as an intermediary between the event sources 100 and the admin application 108a (in this example, the orchestrator) in the system 10a. The event scheduler sub-system 107a may receive the plurality of events from the event sources 100 which may be handled by a plurality of event handlers 102a-102f. The event scheduler sub-system 107a may prioritize processing of the events, may aggregate the events, and/or may serialize the events for processing in a particular order by the processor(s) 88 as described above. The event scheduler sub-system 107a may have event handlers 102a-102n, SPCO event-type table 104a, and an event scheduler 106a.

FIGS. 10A-10B depict a hypothetical SPCO event-type table 104a, similar in structure to the event-type table 104, except as described. The SPCO event-type table 104a may be provided with a plurality of priority group numbers 0-13 each of which have an associated group name and one or more event types. The hypothetical SPCO event-type table 104a may be associated with SPCO software system which may be part of the optical transport network 650. Optical transport networks such as the system 10a may require prioritization of system events for processing. For instance, network failure related events should be prioritized over deactivation events and the deactivation events should be prioritized over activation events, etc. The SPCO event-type table 104a provides a way for an operator of the optical transport network 650 to define priority group numbers having associated event types to define the prioritization necessary for their specific optical transport network (system 10a). Further, the SPCO event-type table 104a may be updated or changed remotely allowing the operator to optimize processor use in the optical transport network 104a. In the hypothetical SPCO event-type table 104a, event types assigned to lower group number have a higher priority. However, it should be noted that in other implementations, event types assigned to higher group numbers may have a higher priority if the higher group numbers denote higher priority.

Figure 11:
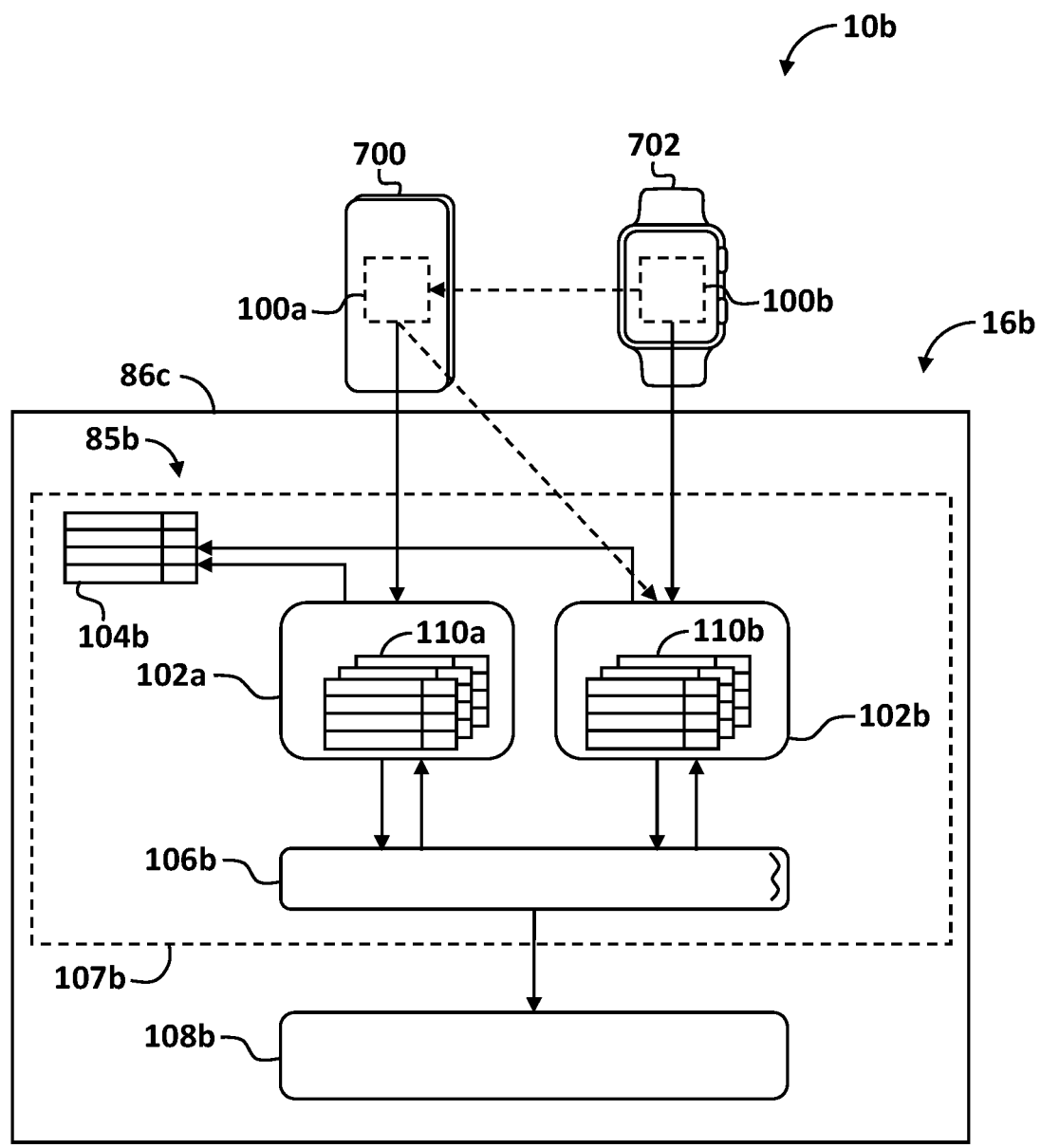
FIG. 11 is a diagram of another hypothetical exemplary use case in accordance with one implementation of the present disclosure.

In another hypothetical example, in one implementation illustrated in FIG. 11, an admin application 108b may be a consumer application such as a travel application, while the plurality of event sources 100 may include a locator application 100a and a health application 100b. In the illustrated implementation, the locator application 100a is running on a first user device 700 that may be a smart phone, for instance, and the health application 100b is running on a second user device 702 that may be a smart watch, for instance. The consumer application 108b may receive geographical locations from the locator application 100a as a user travels, for instance. For instance, the locator application 100a may record a first location event that places the user at a first location, a second location event that places the user at a second location, and a third location event that places the user at a third location, the first, second, and third location events may be stored in data table 110a, for instance. The health application 100b may record a first health event that includes a first heart rate of the user that may be categorized as a normal heart rate of the user, a second health event that includes a blood pressure of the user that may be categorized as a normal blood pressure of the user, and a third health event that includes a second heart rate of the user that may be categorized as an elevated heart rate of the user.

The event handler 102b associated with the health application 100b may be programmed to deduce an event type of the first health event (which we will refer to as a normal heart rate event for the purposes of illustration), the second health event (which we will refer to as a normal blood pressure event), and the third health event (which we will refer to as an elevated heart rate event). The event handler 102b may add an entry to the respective data tables 110b associated with these health events. The event scheduler sub-system 107b may be programmed to prioritize the critical health events such as an elevated heart rate event for processing before any location events or normal blood pressure events. This might be because the travel application 108b may need to handle critical events first. Further, the event scheduler sub-system 107b may be programmed to aggregate event data to reduce processing requirements and the CPU load. For instance, if the consumer application 108b has not processed the first location event when the second location event is received, the event scheduler sub-system 107 may be programmed to overwrite event data associated with the first location event with event data associated with the second location event such that only the event data associated with the second location event which is the latest is processed by the consumer application 108b.

It should be noted that in some implementations, the second user device 702 may not be configured to connect to the network administration device 16b directly. For instance, the second user device 702 may only be configured for short-range wireless communication (e.g., using Bluetooth®). In such an implementation, the second communication device 702 may be configured to communicate event information through the first communication device 700 (represented by dotted arrow lines in FIG. 11).

Though specific examples have been used, the event scheduler sub-system 107 may be used in various software domains to address processing critical events efficiently. Nonexclusive examples of such software domains include military applications, healthcare and life-support systems, communication systems, weather monitoring applications, and high frequency financial trading applications.

Further, while exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

CONCLUSION

Conventionally, software systems may comprise a consumer software application which processes events generated from multiple producer software applications. In some computer systems, it may be possible that before the consumer software application is scheduled on a central processing unit (the CPU) and has a chance to process these events, there may be a pile-up of multiple events from the same or different producer software applications. In current systems that have a shared processor and consumer software applications which need to process events generated from multiple producer software applications, there may be a pile-up of multiple events from the same or different producer software application(s) before the consumer application is scheduled on the shared processor. In the current systems, events may be processed using only one of serialized processing, aggregation of events, or prioritization, for example. However, current systems may not support serialization, aggregation, and prioritization concurrently based on the specific type of these events within the same software implementation. Further, known systems are not user programmable, which means, for example, that they cannot utilize serialization, aggregation, and prioritization for different events based on operator and/or client specific requirements.

The systems and methods described herein solve these and other problems by providing an event scheduling mechanism (such as an event scheduler sub-system) configured to allow prioritization of events generated by multiple producer applications, sequential processing of stateful events of the same priority either from the same producer or different producer applications, and/or aggregation of stateless events generated by a producer application and handing-off the latest event for processing to the consumer software application. In one implementation, the systems and methods are utilized in conjunction with an optical data transportation network and/or network components.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system, comprising:
   a processor; and
   one or more non-transitory computer readable memory storing instructions and data associated with an event scheduler and two or more event handlers, each event handler of the two or more event handlers associated with a corresponding event source of two or more event sources, the data associated with the two or more event handlers comprising a plurality of data tables for each of the event handlers, each of the plurality of data tables having an associated event type, the data associated with the event scheduler comprising a priority queue and a global insertion order number, wherein the instructions, when executed by the processor, cause the processor to:
   receive, from one of the two or more event sources, an event and associated event data;
   determine, by the event handler corresponding to the event source of the event data, an event type and an object key for the event;
   store the event data in one of the plurality of data tables of the event handler corresponding to the event source of the event data, the one of the plurality of data tables having an associated event type that matches the event type of the event;
   generate, using the event handler, a priority group number associated with the event;
   generate, using the event handler, an insertion order number associated with the event, by incrementing the global insertion order number;
   generate, using the event handler, a new queue element comprising the priority group number, the insertion order number, a reference to the event handler, the object key, and the event type of the event;
   insert the new queue element to the priority queue of the event scheduler, the priority queue storing at least one existing queue element, the existing queue element comprising a second priority group number, a second insertion order number, a second reference to an event handler, a second object key, and a second event type of a second event, wherein inserting the new queue element includes organizing the new queue element and the existing queue element in order of priority in the priority queue of the event scheduler based on a comparison of the priority group number of the new queue element and the second priority group number of the existing queue element;
   send a signal from the event handler to the event scheduler, the signal indicating availability of the new queue element to process;
   retrieve, using the event scheduler, the event data associated with a queue element with a highest priority in the priority queue from the one of the plurality of data tables; and
   pass the event data associated with the queue element with the highest priority in the priority queue from the event scheduler to an admin application for processing.

2. The system of claim 1, wherein retrieving the event data associated with the queue element with the highest priority further comprises:
   deleting the event data from the one of the plurality of data tables of the event handler.

3. The system of claim 2, wherein the event data comprises the object key and an object data.

4. The system of claim 1, wherein organizing the new queue element and the existing queue element in order of priority in the priority queue of the event scheduler further comprises comparing the insertion order number of the new queue element and the second insertion order number of the existing queue element.

5. The system of claim 4, wherein organizing the new queue element and the existing queue element in order of priority in the priority queue of the event scheduler further comprises:
   determining that the priority group number of the new queue element is equal to the second priority group number of the existing queue element by comparing the priority group number of the new queue element and the second priority group number of the existing queue element;
   comparing the insertion order number of the new queue element and the second insertion order number of the existing queue element to determine whether the insertion order number of the new queue element is lower than the second insertion order number of the existing queue element; and
   arranging the new queue element and the existing queue element in order of priority based on which one of the new queue element and the existing queue element has a lower insertion order number.

6. The system of claim 1, wherein the event handler uses information stored in an event-type table to generate the priority group number associated with the event.

7. The system of claim 1, wherein the event is a first event and the associated event data is associated first event data, and wherein the instructions, when executed by the processor, cause the processor to:
- receive, from the two or more event sources, a second event and associated second event data; and,
- aggregate, the first event data and the second event data.

8. The system of claim 7, wherein causing the processor to aggregate the first event data and the second event data, comprises causing the processor to:
- determine, by the event handler corresponding to the event source of the second event data, a second event type and a second object key for the second event;
- determine that the second event type is the same as the first event type by comparing the second event type and the first event type;
- determine that the second object key is the same as the object key associated with the first event by comparing the second object key to the object key for the first event; and
- overwrite the event data associate with the first event in the one of the plurality of data tables with the second event data associated with the second event.

9. The system of claim 1, wherein the instructions, when executed by the processor, cause the processor to:
- process, by the admin application, the event data passed from the event scheduler to the admin application.

10. The system of claim 1, wherein the event is a first event and the associated event data is first event data, and wherein the instructions, when executed by the processor, cause the processor to:
- receive, from the two or more event sources, a second event and second event data associated with the second event; and,
- serialize the first event data and the second event data.

11. The system of claim 10, wherein causing the processor to serialize the first event data and the second event data, comprises causing the processor to:
- generate, using the event handler, a second event type and a second object key associated with the second event;
- compare the second event type and the event type associated with the first event, determine that the second event type is the same as the event type associated with the first event, and compare the second object key to the object key associated with the first event;
- determine that the second object key is the same as the object key associated with the first event; and
- append the second event data to the first event data in the one of the plurality of data tables having the associated event type that matches the event type of the first event and the second event.

12. The system of claim 6, wherein the priority of the event types in the event-type table is user-programmable.

13. The system of claim 1, wherein after receiving the event and associated event data, the instructions cause the processor to lock all of the plurality of data tables of the event handler associated with the event source of the event data, such that the plurality of data tables are uneditable while the plurality of tables are locked.

14. The system of claim 1, wherein after generating the priority group number associated with the event, the instructions cause the processor to lock all data members of an event scheduler, such that the data members are uneditable while the data members are locked, the data members including the priority queue and the global insertion order number associated with the event scheduler.

15. The system of claim 14, wherein after the new queue element is inserted into the priority queue of the event scheduler, the instructions cause the processor to unlock all data members of the event scheduler, such that the data members are editable after the data members are unlocked.

16. The system of claim 13, wherein after sending the signal from the event handler to the event scheduler, the instructions cause the processor to unlock all of the plurality of data tables of the event handler associated with the event source of the event data, such that the plurality of data tables are editable after the plurality of data tables are unlocked.

17. The system of claim 1, wherein the instructions associated with the event scheduler for retrieving the event data associated with the queue element with the highest priority in the priority queue from the one of the plurality of data tables, and passing the event data from the event scheduler to the admin application for processing, are executed in a thread separate from threads which update the event data to the plurality of data tables within the two or more event handlers.

18. A method, comprising:
- receiving, with a processor and one or more non-transitory computer readable memory, an event and associated event data from one of two or more event sources, wherein the one or more non-transitory computer readable memory stores instructions executable by the processor and stores data associated with an event scheduler and two or more event handlers, each event handler of the two or more event handlers associated with a corresponding event source of two or more event sources, the data associated with the two or more event handlers comprising a plurality of data tables for each of the event handlers, each of the plurality of data tables having an associated event type, the data associated with the event scheduler comprising a priority queue and a global insertion order number, the processor executing the instructions to carry out the following:
- determining by the event handler corresponding to the event source of the event data, an event type and an object key for the event;
- storing the event data in one of the plurality of data tables of the event handler corresponding to the event source of the event data, the one of the plurality of data tables having an associated event type that matches the event type of the event;
- generating, using the event handler, a priority group number associated with the event;
- generating, using the event handler, an insertion order number associated with the event, by incrementing the global insertion order number;
- generating, using the event handler, a new queue element comprising the priority group number, the insertion order number, a reference to the event handler, the object key, and the event type of the event;
- inserting the new queue element to a priority queue of an event scheduler, the priority queue storing at least one existing queue element, the existing queue element comprising a second priority group number, a second insertion order number, a second reference to an event handler, a second object key, and a second event type of a second event, wherein inserting the new queue element includes organizing the new queue element and the existing queue element in order of priority in the priority queue of the event scheduler based on a comparison of the priority group number of the new queue element and the second priority group number of the existing queue element;

sending a signal from the event handler to the event scheduler, the signal indicating availability of the new queue element to process;

retrieving, using the event scheduler, the event data associated with a queue element with a highest priority in the priority queue from the one of the plurality of data tables; and passing the event data associated with the queue element with the highest priority in the priority queue from the event scheduler to an admin application for processing.

19. The method of claim 18, wherein organizing the new queue element and the existing queue element in order of priority in the priority queue of the event scheduler further comprises:

determining that the priority group number of the new queue element is equal to the second priority group number of the existing queue element by comparing the priority group number of the new queue element and the second priority group number of the existing queue element;

comparing the insertion order number of the new queue element and the second insertion order number of the existing queue element to determine whether the insertion order number of the new queue element is lower than the second insertion order number of the existing queue element; and arranging the new queue element and the existing queue element in order of priority based on which one of the new queue element and the existing queue element has a lower insertion order number.

20. The method of claim 18, wherein the event is a first event and the associated event data is associated first event data, and wherein the method further comprises:

receiving, from the two or more event sources, a second event and associated second event data;

determining, by the event handler corresponding to the event source of the second event data, a second event type and a second object key for the second event;

determining that the second event type is the same as the first event type by comparing the second event type and the first event type;

determining that the second object key is the same as the object key associated with the first event by comparing the second object key to the object key for the first event; and overwriting the event data associate with the first event in the one of the plurality of data tables with the second event data associated with the second event.

* * * * *